(12) United States Patent
Hur

(10) Patent No.: US 10,913,506 B2
(45) Date of Patent: Feb. 9, 2021

(54) GENERATOR FOR BICYCLE, AND BATTERY MODULE ATTACHABLE/DETACHABLE TO/FROM GENERATOR

(71) Applicant: Young Hui Hur, Daegu (KR)

(72) Inventor: Young Hui Hur, Daegu (KR)

( * ) Notice: Subject to any disclaimer, the term of this patent is extended or adjusted under 35 U.S.C. 154(b) by 388 days.

(21) Appl. No.: 15/315,262

(22) PCT Filed: Mar. 2, 2016

(86) PCT No.: PCT/KR2016/002054
§ 371 (c)(1),
(2) Date: Nov. 30, 2016

(87) PCT Pub. No.: WO2016/144035
PCT Pub. Date: Sep. 15, 2016

(65) Prior Publication Data
US 2017/0151991 A1    Jun. 1, 2017

(30) Foreign Application Priority Data

Mar. 9, 2015  (KR) .......................... 10-2015-0032700
Sep. 10, 2015 (KR) .......................... 10-2015-0128215

(51) Int. Cl.
*B62J 6/12*       (2006.01)
*H02K 21/16*      (2006.01)
(Continued)

(52) U.S. Cl.
CPC . *B62J 6/12* (2013.01); *B62J 6/08* (2013.01); *H02J 7/1407* (2013.01);
(Continued)

(58) Field of Classification Search
CPC ........... B62J 6/12; B62J 6/08; H05B 37/0227; H05B 33/0842; H02J 7/1407;
(Continued)

(56) References Cited

U.S. PATENT DOCUMENTS 3,359,492 A * 12/1967 Kuhrt ..................... G01P 3/505
                                                 324/164
4,486,638 A * 12/1984 de Bennetot ........ H02K 49/043
                                                 219/631
(Continued)

FOREIGN PATENT DOCUMENTS

EP          2204313 A1    7/2010
KR    10-2005-0107162 A   11/2005
(Continued)

OTHER PUBLICATIONS

Received STIC search report from EIC 2800 searcher Christian Minear on Jul. 16, 2018 for claim 18. (Year: 2018).*

(Continued)

*Primary Examiner* — Shawki S Ismail
*Assistant Examiner* — Htet Z Kyaw

(57) ABSTRACT

The present invention provides a generator for a bicycle which can be applied to a rim of all kinds of bicycle wheels, comprising: a rotating body 30 which is arranged to be adjacent to or to make contact with the rim 10, wherein eddy current induction magnet 35 is installed along an outer circumferential surface of the rotating body 30; a rotation shaft 62 whose one side end part is fixed at a center of the rotating body 30; and a generation unit 60 which is arranged at the other side end part of the rotation shaft 62, wherein at least a portion of the outer circumferential surface of the rotating body 30 is arranged farther outside than an outer circumferential surface of the eddy current induction magnet 35.

5 Claims, 10 Drawing Sheets

(51) Int. Cl.
  *B62J 6/08* (2006.01)
  *H02J 7/14* (2006.01)
  *H05B 45/00* (2020.01)
  *H05B 47/105* (2020.01)
  *H02K 7/18* (2006.01)
  *H02K 11/04* (2016.01)

(52) U.S. Cl.
  CPC .......... *H02J 7/1438* (2013.01); *H02K 7/1846* (2013.01); *H02K 21/16* (2013.01); *H05B 45/00* (2020.01); *H05B 47/105* (2020.01); H02K 11/046 (2013.01)

(58) Field of Classification Search
  CPC ..... H02J 7/1438; H02K 21/16; H02K 7/1846; H02K 11/046
  USPC .................. 310/219–253, 43, 44, 67 A, 75 C
  See application file for complete search history.

(56) References Cited

U.S. PATENT DOCUMENTS

| | | | | |
|---|---|---|---|---|
| 6,650,106 | B2* | 11/2003 | Daalmans | G01P 3/505 |
| | | | | 324/164 |
| 2010/0181879 | A1* | 7/2010 | Lee | B62J 6/06 |
| | | | | 310/75 R |
| 2010/0219177 | A1* | 9/2010 | Matsui | F24H 3/0405 |
| | | | | 219/600 |
| 2014/0085914 | A1 | 3/2014 | Liao | |
| 2014/0132155 | A1* | 5/2014 | Strothmann | B62J 6/08 |
| | | | | 315/77 |
| 2015/0062939 | A1* | 3/2015 | Frieden | B62J 6/06 |
| | | | | 362/475 |

FOREIGN PATENT DOCUMENTS

| | | |
|---|---|---|
| KR | 10-2011-0132122 A | 12/2011 |
| KR | 10-1320295 B1 | 10/2013 |
| KR | 10-2014-0028427 A | 3/2014 |
| KR | 10-2014-0062463 A | 5/2014 |
| KR | 10-1471392 B1 | 12/2014 |
| WO | 2005-075284 A2 | 8/2005 |

OTHER PUBLICATIONS

Received STIC search report from EIC 2800 searcher John Digeronimo on Feb. 27, 2019 for claim 24. (Year: 2019).*

International Search Report dated Jun. 29, 2016 corresponding to International Application PCT/KR2016/002054 citing the above reference(s).

* cited by examiner

GENERATOR FOR BICYCLE, AND BATTERY MODULE ATTACHABLE/DETACHABLE TO/FROM GENERATOR

CROSS REFERENCE TO RELATED APPLICATION

This application claims the priority of Korean Patent Application Nos. 10-2015-0032700, filed on Mar. 9, 2015, and 10-2015-0128215, filed on Sep. 10, 2015, in the KIPO (Korean Intellectual Property Office). Further, this application is the National Phase Application of International Application No. PCT/KR2016/002054 filed Mar. 2, 2016, which designates the United States and was published in Korean. All of the priority documents are hereby incorporated by reference in their entireties.

TECHNICAL FIELD

The present invention relates to a generator and a battery for a bicycle and, more specifically, to a generator for a bicycle, which can be applied to a rim of a bicycle wheel, and a charging battery module which can be applied to various kinds of portable generators including the portable generator for a bicycle. Also, the present invention further relates to a battery module applied to the generator for a bicycle and, more specifically, to a battery module which can be applied to all kinds of portable generators and supplies power to an external device or to a light emitting diode (LED) lamp.

BACKGROUND ART

An eddy current is a vortex current flowing on a metal conductor by an electromotive force generated when a magnetic flux varies within the metal conductor. A power loss due to the eddy current is called an eddy current loss and it is converted to a thermal loss, which increases a temperature of the metal conductor. A force generated by the eddy current is used in a power meter or for an electric brake in an electric vehicle.

A ferromagnetic substance refers to a material which is magnetized strongly in a direction of a magnetic force, when a strong magnetic field is applied from outside, and then still remains magnetized after the magnetic field is removed. In this case, each of the atoms, which constitute the substance, serves as a single magnet. An iron (Fe) is a representative ferromagnetic substance.

A non-magnetic material (non-magnetic substance) refers to a substance which is weakly magnetized or which is not magnetized at all. The non-magnetic substance includes a paramagnetic substance which is to be explained in the following. A relative permeability is a value close to 1, and it is not affected by a magnetic field.

A paramagnetic substance is a substance which is magnetized when inserted into a magnetic field and which is not magnetized after the magnetic field is removed. Aluminum, tin, platinum, iridium, etc. are categorized as the paramagnetic substance. A degree of magnetization in proportion to a magnitude of a magnetic field is represented as a susceptibility. The susceptibility grows in an inverse proportional relation with respect to the temperature, and this phenomenon is called the Curie's Law.

Meanwhile, in the prior art, a generator which induces a current in a coil winding arranging around a magnet by installing a rotor near to an aluminum bicycle rim and attaching magnets around the rotor such that N and S poles of the magnets are alternately arranged. Then, when the bicycle rim is rotated, an eddy current is induced on the bicycle rim by the magnetic flux of the magnets around the rotor which then pulls the magnets around the rotor according to a magnetic interaction generated by the eddy current. Finally, as the rim is rotated, the rotor is rotated in a contactless manner, which causes the magnets around the rotor, which have been used to cause the eddy current, to rotate once.

On the other hand, this conventional contactless generator has the following problems.

First, since the aluminum bicycle rim is made by bending a narrow and long rim member in a circular manner and then bonding the ends thereof with each other, a bonded portion made by a rim fabricating procedure is made of the iron which is a ferromagnetic substance. Therefore, the magnets around the rotor are pulled by the iron portion to be attached to the rim, and then removed from the rim repeatedly. This phenomenon causes both the magnet and the rim to be damaged, and affects adversely to a uniform rotation speed of the rotor, which results in a dramatic loss in generation efficiency and a generation of noise, etc.

Second, the conventional contactless generator cannot be used for a rim which is made of the iron, which is a ferromagnetic substance. The reason is that the magnets, which are installed around the rotor to induce the eddy current, are pulled and attached to the rim.

Third, this conventional contactless generator cannot be used for a rim which is made of carbon which is a nonmetal substance, either. It cannot be used for the carbon rim since no eddy current is induced in the carbon rim.

Fourth, since an electromotive force is induced by the magnets, which are attached to the rotor to induce the eddy current, and a load is driven to generate a braking force due to a load current, a slip phenomenon (a speed of the rotor gets far lower than that of the rim) occurs, which results in a loss in a rotational force greater than the energy lost during the generation procedure.

Fifth, since the current is induced by using the magnets, which are attached to the rotor to induce the eddy current, the magnets attached to the rim are to be arranged to be near to the rim. Therefore, a harsh spatial constraint is applied, and a core, which is used to induce a magnetic path for generation, cannot be used. That is, the core cannot be installed due to the spatial constraints, and the magnetic path formed by the magnets attached to the rotor is greatly lost in air because no core is available, which decreases the generation amount. In addition, the rotational speed of the rotor itself also falls a lot since almost no eddy current is generated when the rim rotates at a low speed according to the eddy current principal. Therefore, almost no electromotive force can be induced at the low speed when the generation efficiency is also low.

Another major concern related to the problem of generation efficiency of the generator is an energy accumulation technology which collects the electricity produced by small capacity generators and converts the collected electricity to store. That is, a technology which produces a small amount of power and accumulates the produced power while minimizing the loss in the produced power is needed.

Also, as for small portable generators, various types of generators have been produced and sold in the market. Therefore, an energy accumulation technology which can be applied to various types of generators carried by individual users is needed. In particular, it can happen that the same user has a plurality of different types of generators or replace the previous portable generator which causes a change in the generation method of the portable generator. It is very cumbersome when new battery modules are required according to different generators with different generation methods. However, since the conventional technology is mostly restricted to alternating current (AC) type generators and the energy accumulation technology also develops in the field, a technology which can be applied not only to the AC generator but also to a direct current (DC) type generator is highly required. In addition, the conventional energy accumulation technology does not adopt an active energy accumulation method to a multiphase structure generator which has a phase relation among coils to raise a generation efficiency of the generator.

Next, since the conventional battery module supplies power to the external device by using the electric energy stored in an embedded battery, it has a limited use when it supplies power to the external device while charging the battery at the same time. That is, as for the conventional battery module, when the battery is discharged, it cannot supply power to the external device until the battery is charged to a certain level.

Also, as for a conventional bicycle generator with an integrated LED lamp, the power generated by the generator is directly supplied to the LED lamp, which results in a loss in the generated power when it is not necessary to turn on the LED lamp. Even during the night hours when the LED lamp is to be turned on, the LED lamp functions well only when the speed of the bicycle is high enough for the generator to generate a sufficient amount of energy. However, when the bicycle travels on a rough road or when the bicycle has to be slowed down on a narrow and crooked road (the LED lamp is desperately needed in this situation), the LED lamp cannot function properly.

In order to solve the aforementioned problems, the inventors had come to an idea that the power produced in the generator was stored in the battery and the battery supplied power to the LED lamp. On the other hand, the inventors have found that by using this method, when a level of remaining power of the battery was low, almost all power was consumed to charge the battery even when the speed of the bicycle was raised to increase the amount of power generated by the generator, which resulted in the improper operation of the LED lamp.

The relevant prior art is described in the Laid Open Patent publication number No. KR10-2014-0062463, the Patent registration number No. KR10-1320295, the Patent registration number No. KR10-1471392, and the Laid Open Patent publication number No.

DISCLOSURE

Technical Problem

The present invention has been envisaged to solve the aforementioned problems, and it is an objective of the present invention to provide a generator for a bicycle which can be used for all kinds of rims and have a sufficient generation efficiency.

In addition, another objective of the present invention is to provide a battery module which can be applied to all types of portable generators including a bicycle generator, charge all batteries using both AC and DC currents, and have a simple circuit structure and a high charging efficiency.

Furthermore, a still another objective of the present invention is to provide a battery module which can supply power to the external device attached to the battery module irrespective of remaining charged amount of the battery, and which can properly manage an LED lamp which is attached to the battery module.

Technical Solution

In order to accomplice the objectives as above, the present invention provides a rotating body which can be used with all kinds of rims and a generator for a bicycle having a configuration in which an eddy current induction magnet and a generation magnet are arranged separately.

More particularly, the present invention provides a rotating body 30 which is used with a generator 20 installed at a fixed position relative to a rotating rim 10 of a bicycle, wherein the rotating body an eddy current induction magnet 35 is arranged to be adjacent to or to make contact with the rotating body 30 and along an outer circumferential surface of the rotating body 30, and wherein one side end part of a rotation shaft 62 of a generation unit is fixed at a center of the rotating body 30.

At least a portion of the outer circumferential surface of the rotating body 30 can be arranged farther outside than an outer circumferential surface of the eddy current induction magnet 35.

A side surface of the rotating body 30 can be inclined corresponding to an inclined surface of the rim 10.

The rotating body 30 contains a plurality of eddy current induction magnets 35, and the eddy current induction magnets 35 can be arranged on the rotating body 30 such that polarities thereof facing the outer circumferential surface of the rotating body 30 are alternately arranged.

The eddy current induction magnets 35 can be arranged in a configuration that the eddy current induction magnet 35 is inserted into the rotating body 30 from outside the rotating body 30 or a configuration that the eddy current induction magnet 35 is embedded inside the rotating body 30, such that a side surface of the rotating body 30 covers an outer side of the eddy current induction magnet 35.

The eddy current induction magnet 35 and a magnet housing unit 33, which is formed on an outer circumference of the rotating body 30 to house the eddy current induction magnet 35 therein, can have angled shapes such that a rotational movement of the eddy current induction magnet 35 within the rotating body 30 is prevented.

A center member 37 whose rigidity is relatively higher than that of the rotating body 30, is installed at the center of the rotating body 30, and the rotation shaft 62 can be fixed on a center of the center member 37, a plurality of uneven structures are formed on an outer circumferential surface of the center member 37, and the center member housing unit 31 formed at the center of the rotating body 30 can have a shape corresponding to the center member 37, and corresponding uneven structures of the center member 37 and the center member housing unit 31 are engaged with each other such that the center member 37 rotates along with the rotating body 30 as an integral part.

Also, the present invention provides a generator 20 installed at a fixed position relative to a rotating rim 10 of a bicycle characterized in comprising: a rotating body 30 which is arranged to be adjacent to or to make contact with the rim 10, wherein eddy current induction magnet 35 is installed along an outer circumferential surface of the rotating body 30; a rotation shaft 62 whose one side end part is fixed at a center of the rotating body 30; and a generation unit 60 which is arranged at the other side end part of the rotation shaft 62.

The generation unit 60 can includes a case 70 which is installed at a fixed position relative to the rim 10; a core 66 which is fixed inside the case 70, a coil 68 wound around the generation unit 60, and a magnet 64 which is installed on a rotation shaft arranged in a space surrounded by the core 66 and the coil 68.

In addition, the present invention provides an installation corresponding to kinds of rims of a bicycle, comprising the steps of: arranging a generator such that an axis of the rotating body and an axis of a wheel are substantially perpendicular to each other; arranging the generator such that the rotating body faces toward the rim while a generation unit faces toward a hub; and fixing the generator such that a side surface of the rotating body is adjacent to or to make contact with a side surface of the rim.

When the generator is installed on the bicycle having a wheel made of a ferromagnetic substance or a paramagnetic substance, a spacing between a side surface of the rotating body and the rim can be 1-10 mm.

When the generator is installed on the bicycle having a wheel made of a nonmetal substance without causing an eddy current, the generator can be fixed on the generator such that an upper portion of the side surface of the rotating body comes into contact with a lower portion of the rim.

Also, the present invention provides a battery module characterized in comprising: an input terminal 100 to which an output terminal of a generator 20 is connected; a constant voltage unit 200 including a rectifying unit 210 for rectifying a generator output, which is inputted through the input terminal 100, to a DC voltage, and a constant voltage unit 200 for regulating the DC voltage, which is rectified in the rectifying unit 210, into a constant voltage and outputting the constant voltage; and a charging unit 300 which is connected with an output terminal of the constant voltage unit 200, wherein the charging unit 300 includes a battery 320, which is charged by a constant DC voltage outputted from the constant voltage unit 200, a terminal 340, which receives power from at least one of the DC voltages outputted from the constant voltage unit 200 and the battery 320, and a control circuit which controls currents flowing among the output terminal of the constant voltage unit 200, the battery 320, and the terminal 340.

The rectifying unit 210 includes a three-phase bridge rectifying circuit 213 and a two-phase rectifying circuit 212, and an output terminal of the rectifying unit 210 can be connected with the three-phase bridge rectifying circuit 213, when a generator connected with the battery module is a single-phase AC generator or a three-phase AC generator, or connected with the two-phase rectifying circuit 212, when the generator connected with the battery module is a two-phase AC generator or a DC generator.

Here, two output terminals of the single-phase AC generator can be connected with two input terminals among three input terminals 5, 6, 7 of the three-phase bridge rectifying circuit 213, and two output terminals of the DC generator can be connected with one of input terminals 1, 4 of the two-phase rectifying circuit 212 and one of center tap input terminals 2, 3, respectively.

When an external device is connected through the terminal 340, the control circuit can supply a DC current, which is outputted from the constant voltage unit 200, to the external device and the battery at the same time.

The charging unit 300 further includes a second load terminal or a second load 360, wherein, when the second load is applied, the control circuit can supply the power from the battery to the second load 360, and supply the DC current, which is outputted from the constant voltage unit 200, to the battery 320.

When the battery is fully charged, the control circuit does not supply the DC current, which is outputted from the constant voltage unit 200, to the battery 320.

The charging unit 300 further includes a second load terminal or a second load 360, and the control circuit, when the battery is fully charged and no external device is connected to the terminal 340, can supply the DC current, which is outputted from the constant voltage unit 200, to the second load 360.

The charging unit 300 further includes a second load terminal or a second load 360, and the control circuit, when a remaining charged amount of the battery is not sufficient, can supply the DC current, which is outputted from the constant voltage unit 200, to the second load 360.

The second load can be an LED lamp.

Advantageous Effects

According to the present invention, power can be generated efficiently irrespective of type of the rim of the bicycle to which the generator is installed.

That is, when the rim is made of a ferromagnetic substance, the rotating body can be rotated by a pulling force of the magnet, while the rotating body can be rotated by the eddy current generated in the paramagnetic substance when the rim is made of the paramagnetic substance. Also, when the rim is made of a material which neither is magnetized by a magnetic force nor conducts electricity, the rotating body can still be rotated in a contactless manner. Therefore, the generator can be installed to all kinds of commercially available rims such as an iron rim, an aluminum rim, and a carbon rim.

Also, according to the present invention, problems due to a separation of the magnet from the rim, which occurs when an aluminum rim is used, can be solved at once.

In addition, according to the present invention, an interference between the generator and a wire spoke of the wheel can be prevented in advance by using an inclined shape of the rotating body.

Also, since an impact absorption ratio, an anti-erosion property, and a rolling friction coefficient of the rotating body are improved, the generator can be used in both a contactless manner and a semi-contacting manner. And, since the generator has a center member with high rigidity, problems such as an eccentric rotation can be prevented even at a high rotation speed.

In addition, by using the battery module according to the present invention, the battery module can be generally used for various generation types, and it is compact and costs less since it simplifies or minimizes a configuration of a rectification circuit and a rectification element by combining different rectifying methods with one another.

Also, by using the battery module according to the present invention, an adequate amount of power can be supplied to the external device irrespective of remaining amount of the battery, which enables a user to use the external device without any inconvenience.

In addition, when an LED lamp is to be used, the battery module according to the present invention supplies an adequate amount of power to the LED lamp irrespective of remaining amount of the battery, which increases usability of the LED lamp.

Detailed effects along with the aforementioned effects of the present invention will be described while explaining the embodiments of the present invention enough such that the embodiments can be practiced.

BEST MODE

In the following, preferred embodiments of the present invention will be explained in detail by referring to the appended figures.

It is to be noted that the present invention is not restricted to the embodiments disclosed in the following and can be realized in various different configurations, and the embodiments are provided to fully disclose the present invention and help a person with an ordinary skill in the art completely understand the categories of the present invention.

Figure 1:
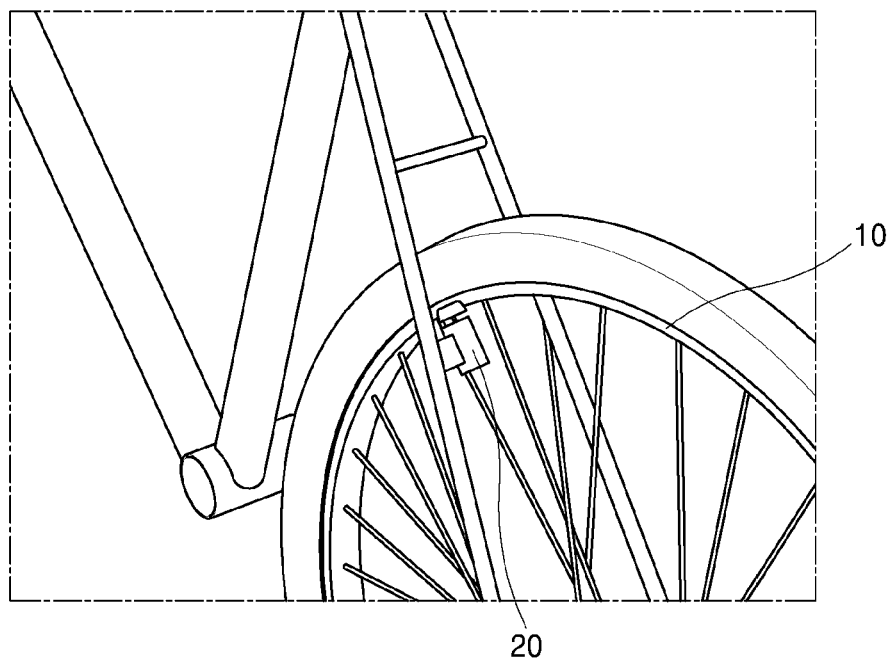
FIG. 1 is a perspective view showing a generator according to the present invention is installed to be close to or make contact with a rim of a bicycle.
Figure 2:
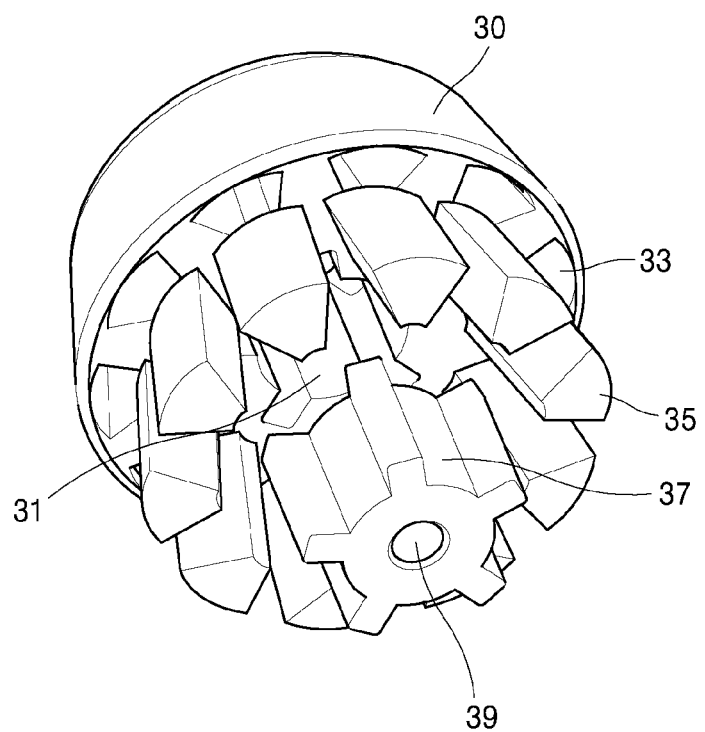
FIG. 2 is an exploded perspective view of a rotating body included in the generator according to the present invention.
Figure 3:
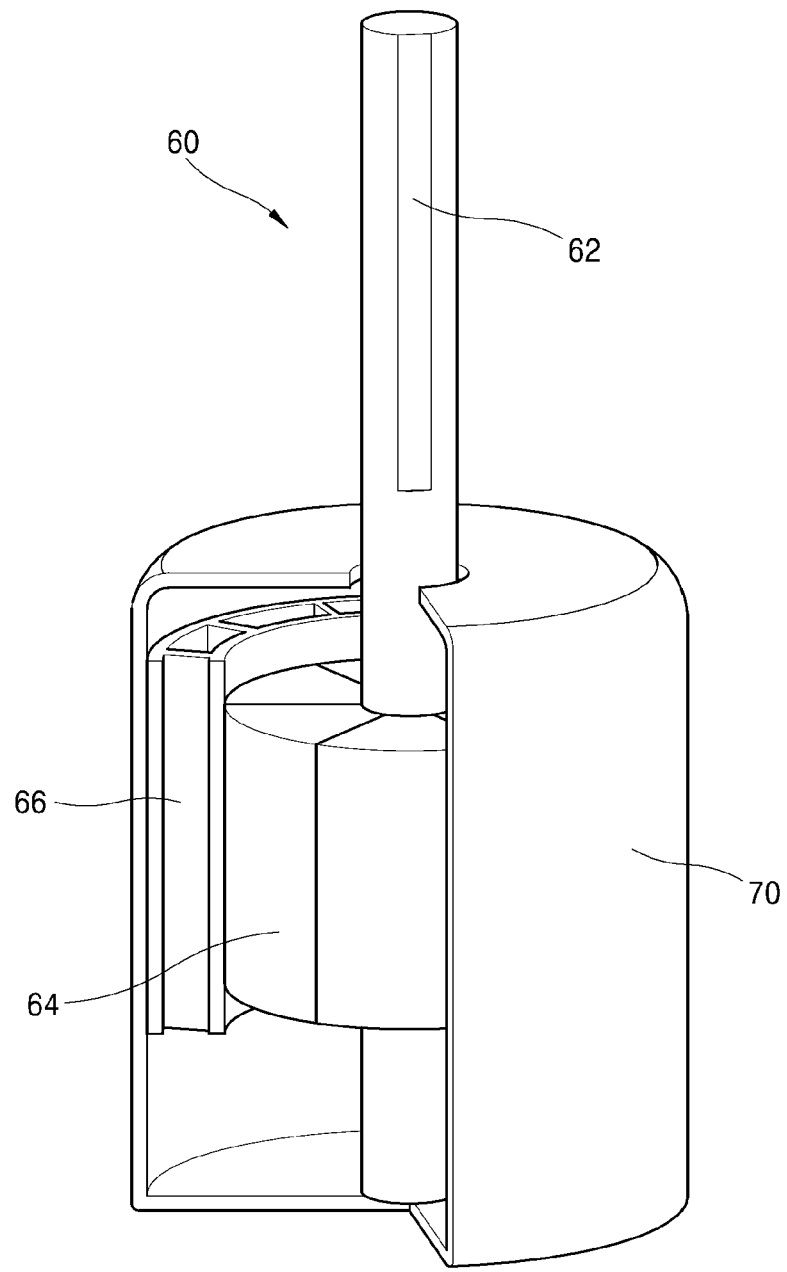
FIG. 3 is a partial perspective view of a generation unit included in the generator according to the present invention.
Figure 4:
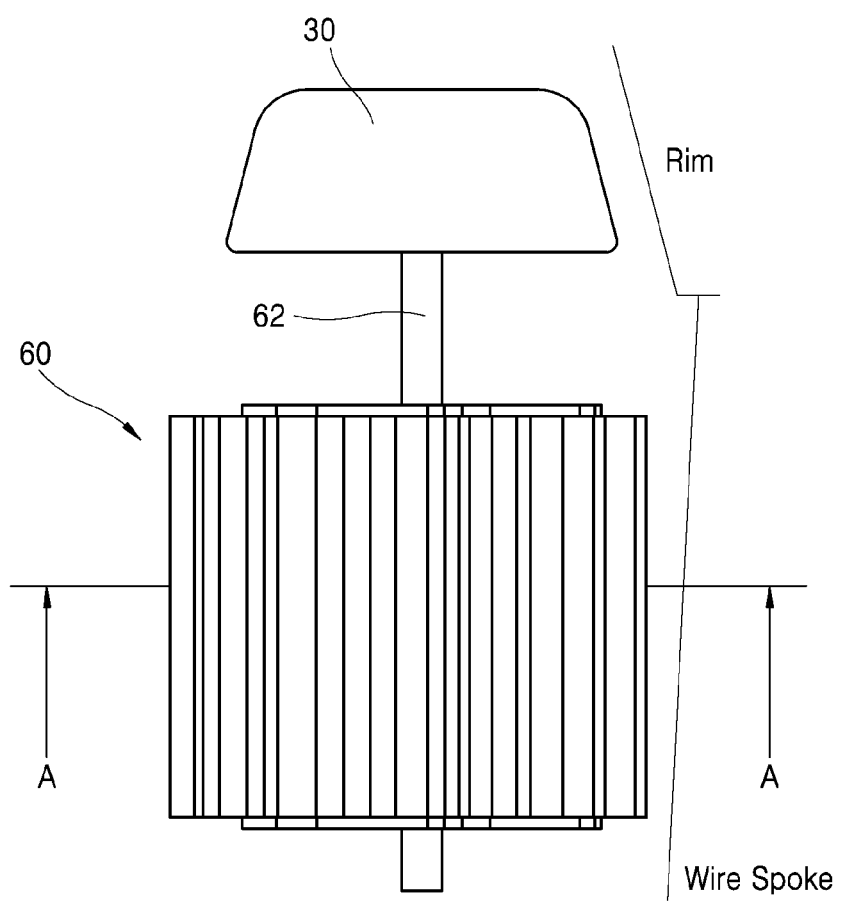
FIG. 4 is a side view of the generator according to the present invention.
Figure 5:
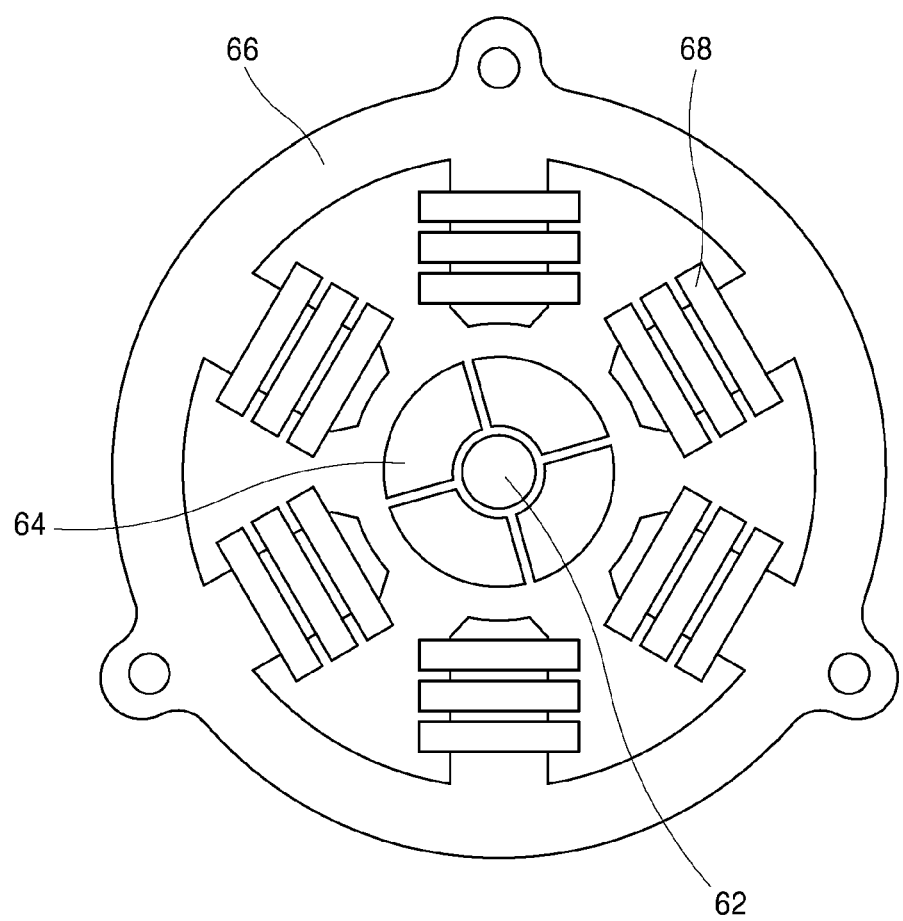
FIG. 5 is a cross-sectional view taken along line A-A of FIG. 4.

FIG. 1 is a perspective view showing a generator according to the present invention is installed to be close to or make contact with a rim of a bicycle, FIG. 2 is an exploded perspective view of a rotating body included in the generator according to the present invention, FIG. 3 is a partial perspective view of a generation unit included in the generator according to the present invention, FIG. 4 is a side view of the generator according to the present invention and FIG. 5 is a cross-sectional view taken along line A-A of FIG. 4.

[Installation Shape and Position of Generator]

As shown in FIG. 1, the generator 20 according to the present invention is installed on the bicycle frame such that the generator 20 is adjacent to or to make contact with a rim 10 of a bicycle wheel. That is, the generator is fixed on the bicycle frame, and when the bicycle wheel rotates, the rim 10 of the bicycle wheel rotates while being adjacent to the generator 20 or making contact with the generator. A rotating body 30, which is to be explained in the following, and a generation unit 60, which is also to be explained in the following, are arranged on and under the generator 20 in the figure, respectively.

A rotation shaft of the rotating body 30 is arranged to be substantially perpendicular to a shaft of the bicycle wheel. That is, a circumferential direction of rotation of a side surface of the rotating body is coincident with a circumferential direction of rotation of a side surface of the rim which faces the rotating body.

[Configuration and Principle of Rotation of Rotating Body]

It is the rotating body 30 portion of the generator 20 which is adjacent to or to makes contact with a rim 10 of the bicycle wheel. When referring to FIG. 2, the rotating body 30 of the bicycle has an outer shape which is substantially a truncated circular cone. That is, a cross-sectional view of the rotating body is trapezoidal. However, the side surface of the rotating body does not have to be necessarily the same as a side surface shape of the truncated circular cone. That is, a configuration having an uneven portion, which is formed in a circumferential direction or an up down direction on the side surface shape, is not excluded from the present invention.

The reason why the rotating body is shaped to have a truncated circular cone shape, that is, to have a trapezoidal cross-section shape is that the rim of the bicycle wheel gets narrower toward a hub which is a center of the wheel. That is, the side surface of the rotating body facing the rim of the wheel is inclined corresponding to an inclined shape of the rim of the wheel, such that the generation unit 60 installed under the rotating body can be installed far away from the wire spoke of the bicycle wheel.

However, the shape of the rotating body is not restricted to the shown embodiment, and it is possible that the rotating body has a circular cylinder shape, a polygonal cylinder shape, and a truncated pyramid shape according to the shape of the rim and a housing method for a magnet.

The rotating body 30 is preferably made of a material of a synthetic resin material which can maintain its shape to some degree and has a high impact absorption ratio, a high anti-erosion property, and a high rolling friction coefficient. For example, a material used for a tire for a vehicle can be used. Also, a low hardness silicon material can still be used.

Magnet housing units 33 are radially formed at a constant spacing along a perimeter of the rotating body as shown in the figure, and eddy current induction magnets 35 are housed in the magnet housing units 33. A plurality of eddy current induction magnets 35 are housed in the magnet housing units 33, such that N and S poles are alternately arranged in a direction of the magnets facing the side surface of the rotating body. When the N pole and S pole are alternately arranged, the rotating body can be readily rotated when the eddy current is induced in the rim. The magnet can be a neodymium magnet and there can be 6-20 magnets according to various factors such as an installation environment, etc. The eddy current induction magnet 35 can be inserted into the magnet housing unit 33 after the rotating body is made, or it can be made as being inserted into the magnet housing unit 33 as an integral part by using an insert-injection method. The magnet housing unit 33 and the eddy current induction magnet 35 have an angled shapes as shown in FIG. 2 such that they maintains their positions without rotating after being inserted into the positions. In particular, when the magnet housing unit 33 and the eddy current induction magnet 35 are made in an asymmetric shape such as a trapezoidal cylinder shape as shown in the figure, it is possible to prevent the eddy current induction magnet 35 from moving freely in the magnet housing unit 33.

A hard center member 37 is inserted into a center of rotation of the rotating body. A center member housing unit 31 having the shape corresponding to that of the center member 37 is formed at the center of the rotating body 30. Uneven portions are formed on an outer surface of the center member 37 and an inner surface of the center member housing unit 31, respectively, such that the rotating body 30 and the center member 37 rotates together. The relatively hard center member 37 is inserted into the center of rotation of the rotating body to support the rotation of the relatively soft rotating body. When compared to the case where the rotating body is made of a soft material, the configuration in which the hard center member 37 is used at the center of the rotating body can greatly suppress the factors causing an uneven rotation, even when the rotating body is elastically deformed.

A rotation shaft housing unit 39, where the rotation shaft 62 is installed, is formed at the center of rotation of the center member 37. Therefore, when the rotating body rotates, the center member and the rotation shaft move as an integral part and rotate.

The rotating body 30 rotates around the rotation shaft 62.

According to the present invention, when the rim of the bicycle wheel is made of an iron, which is a ferromagnetic substance, a pulling force is applied between the eddy current induction magnet 35 of the rotating body 30 and the rim 10, and when the rim rotates, the rotating body 30 is also rotated by the eddy current induction magnet pulled by this pulling force, which results in the rotation of the rotating body. Of course, it can still happen that the rotating body comes into contact with the rim by the pulling force of the eddy current induction magnet 35 in the rotating body 30. However, since the surface of the rotating body is made of a material with a high anti-erosion property and a high rolling frictional force, the rotating body can still be readily rotated along with the rotation of the rim. Thus, by adopting the configuration of the generator and the rotating body according to the present invention, the generator can be used on the rim made of an iron in a contactless manner and/or a contacting manner. Since the pulling force of the magnet is used, it adopts a contactless manner which results in a small energy loss. Also, even when the surface of the rotating body comes into contact with the surface of the rim by the pulling force of the magnet, it utilizes a semi-contacting manner rather than a strong contacting manner. Therefore, the energy loss can be greatly reduced compared to conventional full contacting type generator. That is, the pulling method can be applied along with the semi-contacting manner. When a pulling force method is adopted, a distance between the rotating body and the rim can be 1-10 mm.

Meanwhile, when the rim material of the bicycle wheel is made of aluminum, which is a paramagnetic substance, the magnetic flux of the eddy current induction magnet 35 of the rotating body 30 induces the eddy current on the surface of the rim 10 as the rim rotates, and the eddy current also is applied as the magnetic force to pull the eddy current induction magnet 35, which results in the rotation of the rotating body 30. Then, the rotating body 30 can also be rotated in the contactless manner. In the meantime, it can still happen that the ferromagnetic substance exists at one portion (a bonding portion) along a circumference of the rim 10 and the eddy current induction magnet 35 within the rotating body 30 collides with the rim. However, since the eddy current induction magnet 35 is housed within the rotating body 30, the surface of the rotating body 30 with the rolling frictional force comes to collide with the rim to receive the rotational force, which maintains the rotational force of the rotating body. As a result, the problems of the conventional contactless generator can be solved at once. Therefore, when the generator and the rotating body configuration according to the present invention are adopted, the generator can be used for the rim, which is made of the paramagnetic substance such as aluminum, in the contactless manner. This contactless manner causes less energy loss than a full-contacting manner adopted in the prior art. When the eddy current method is adopted, the distance between the rotating body and the rim can be 1-10 mm.

Also, when the rim material of the bicycle wheel is made of a material such as a carbon, where no eddy current is induced, the side surface of the rotating body 30 comes into semi-contact with the side surface of the rim to rotate. In this case, an upper portion of the side surface of the rotating body is installed to be in contact with a lower portion of the side surface of the rim. Therefore, when the generator and the rotating body configuration according to the present invention are adopted structure, it is possible to use the generator for a rim made of a material such as a carbon which is neither a ferromagnetic substance nor a paramagnetic substance. Therefore, the rotating body according to the present invention can be used for any kind of rim and it is possible to rotate the rotating body in the semi-contacting or the contactless manner.

[Structure of the Generation Unit]

Next, the generation unit 60 according to the present invention will be explained in more detail by referring to FIGS. 3-5.

The rotation shaft 62, which is fixed on the center of the rotating body 30, extends to reach the generation unit 60. The generation unit 60 includes a case, which is fixed on a frame, etc. of the bicycle, and a core 66 which is fixed inside the case 70. As an example, the case 70 can be cylindrical, and the core within the case also has a circular exterior as shown in FIG. 5. Inward bumps are formed at a constant spacing on an inner surface of the core. A coil is wound around the core 66.

Since the generation unit is driven by the rotational motion energy generated from the bicycle, it should output large power even when it is small and light.

A diameter of the core 66 can be around 20-50 mm and around 2-12 coils can be included in one coil bundle. A height of the core can be around 20-50 mm.

A diameter of the coil 68 can be around 0.15-0.4 mm. The case, core, and coil are all fixed.

The rotation shaft 62 is arranged in a space, which is surrounded by the core 66 and the coil 68, and the rotation shaft 62 rotates. A magnet for generation 64 is installed on the rotation shaft 62 and the magnet for generation rotates along with the rotation of the rotation shaft. The magnet for generation 64 can be made of a neodymium magnet, and it can have 2-8 poles.

The generator can be configured as single, two, or three phase generators according to the number of poles of the magnet and the number of coil bundles.

According to the present invention, the eddy current induction magnet 35, which is installed on the rotating body to induce the eddy current, is arranged to be separate from the magnet 64, which makes it possible to install an armature coil on the core when configuring the generator. Therefore, a magnetic path can be formed to increase the power generation efficiency when compared to the conventional contactless generator.

[Battery Module]

Figure 6:
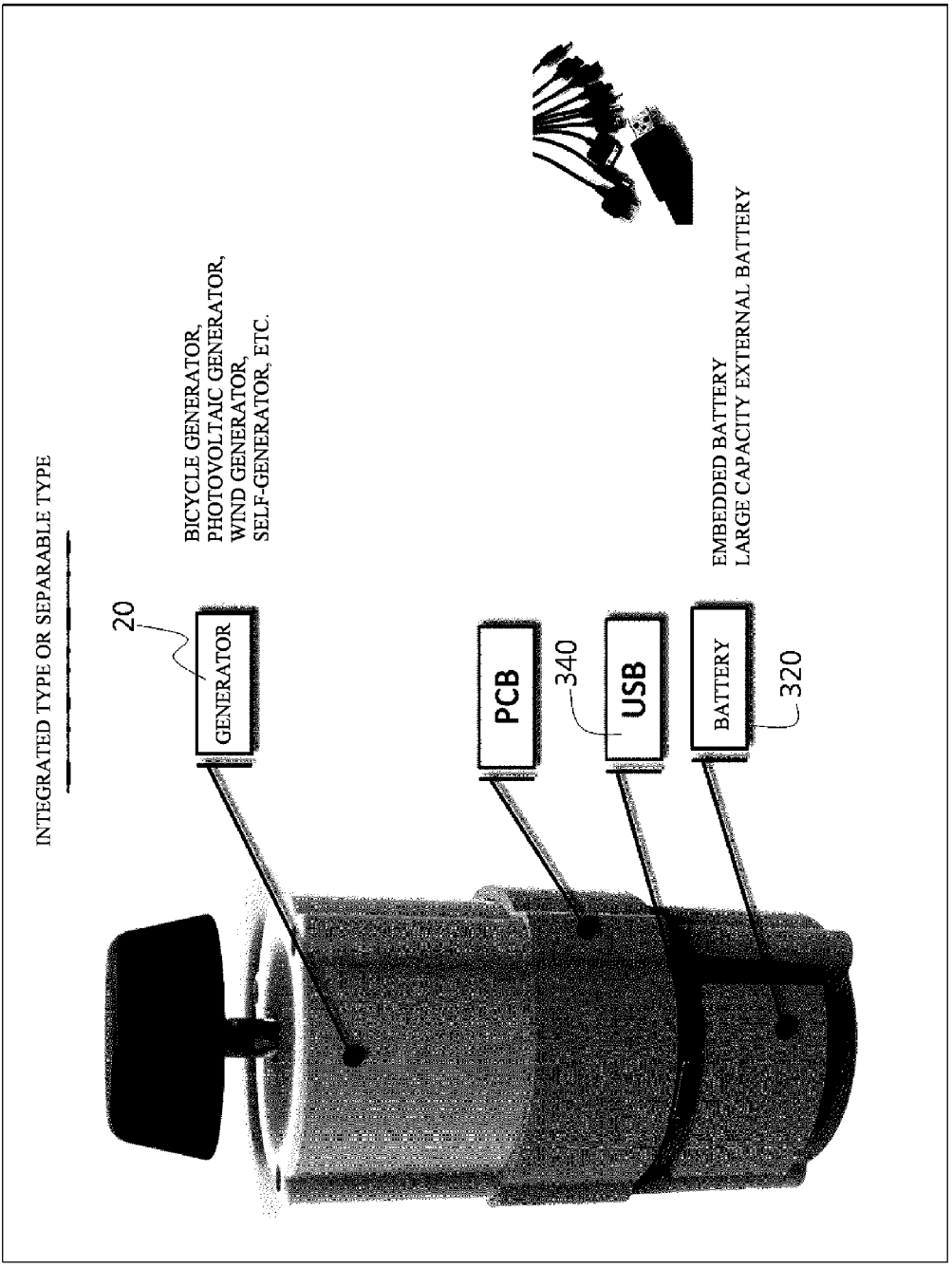
FIG. 6 is a conceptual diagram of the battery module according to an embodiment of the present invention.
Figure 7:
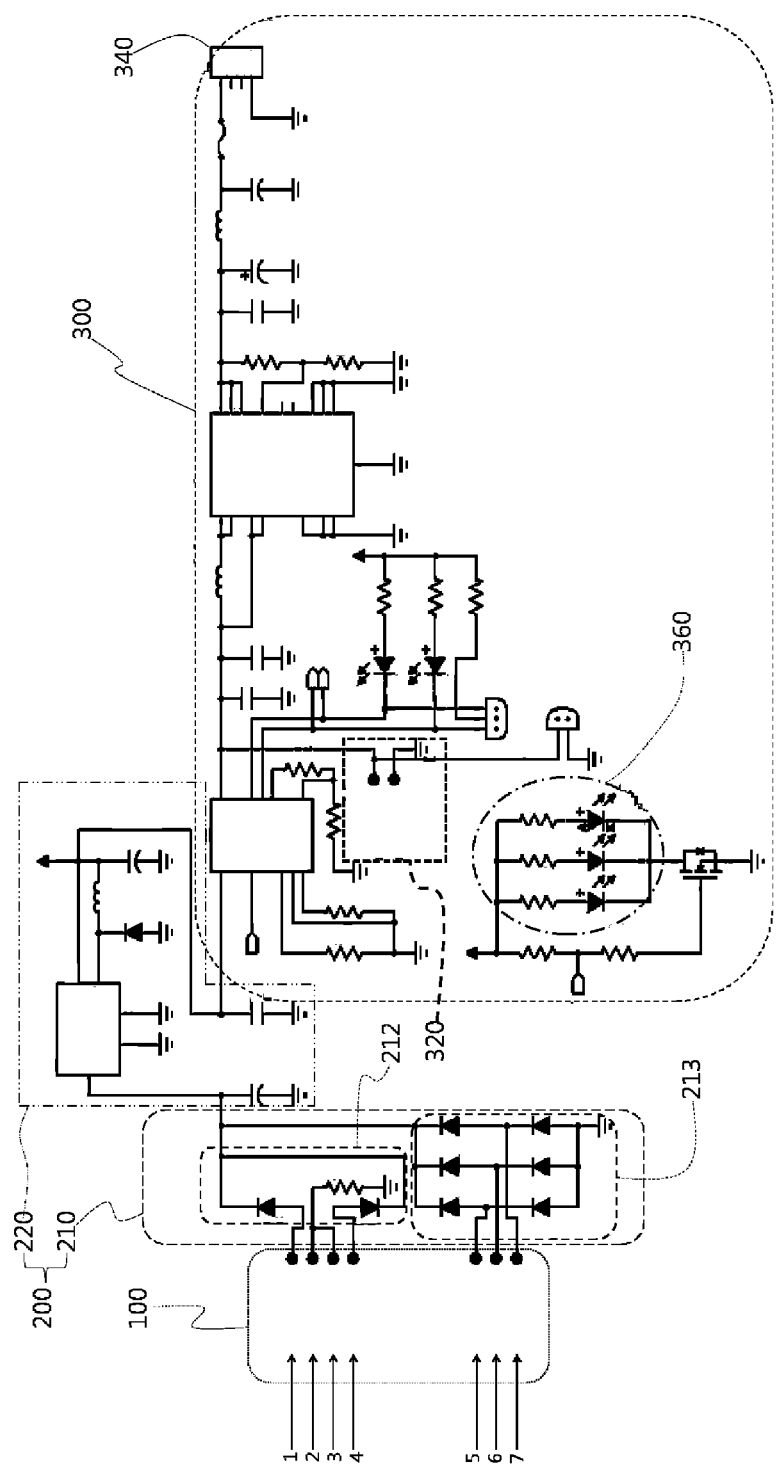
FIG. 7 is a circuit diagram of the battery module according to an embodiment of the present invention.
Figure 8:
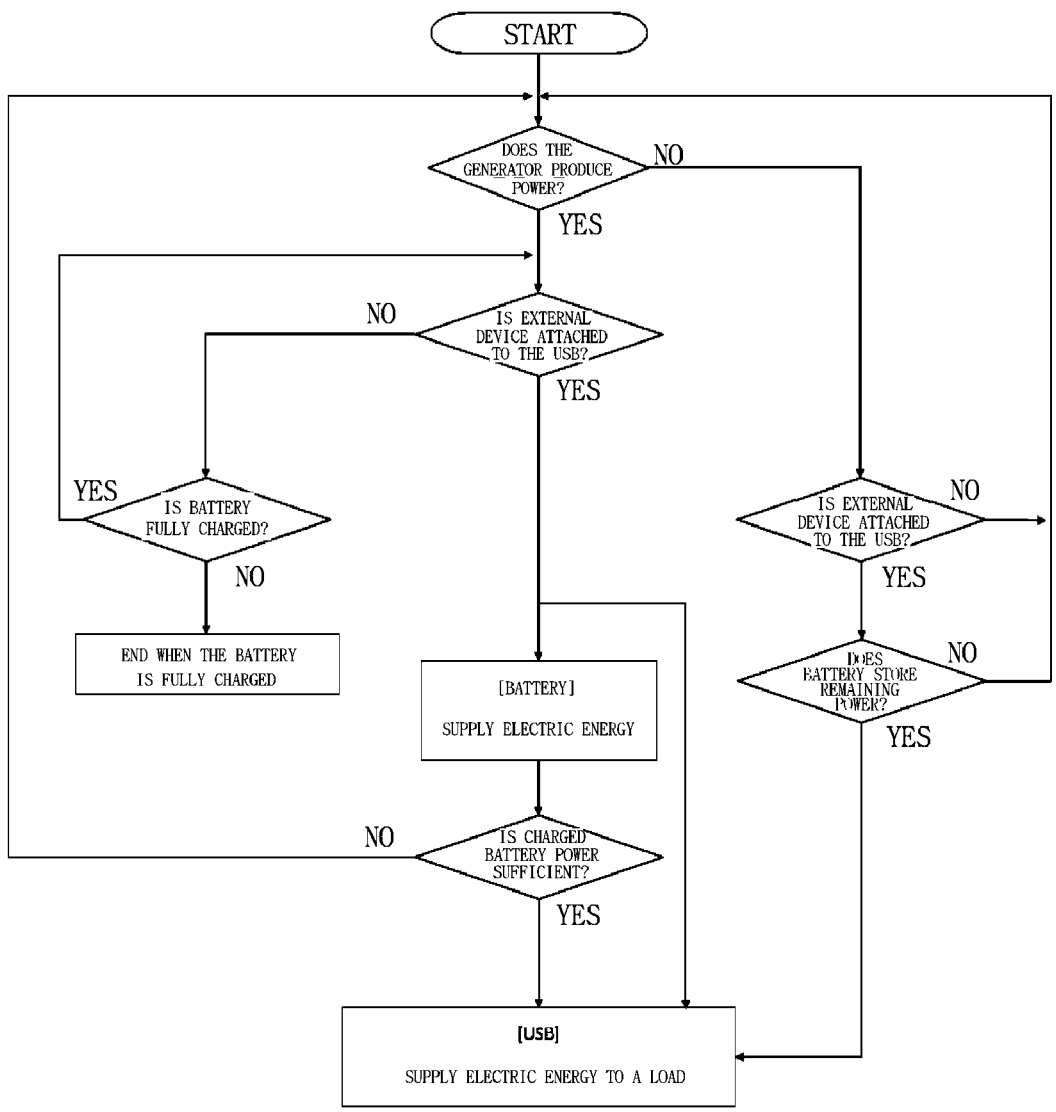
FIG. 8 is a flowchart schematically showing a control method of a control device for the battery module according to the present invention.
Figure 9:
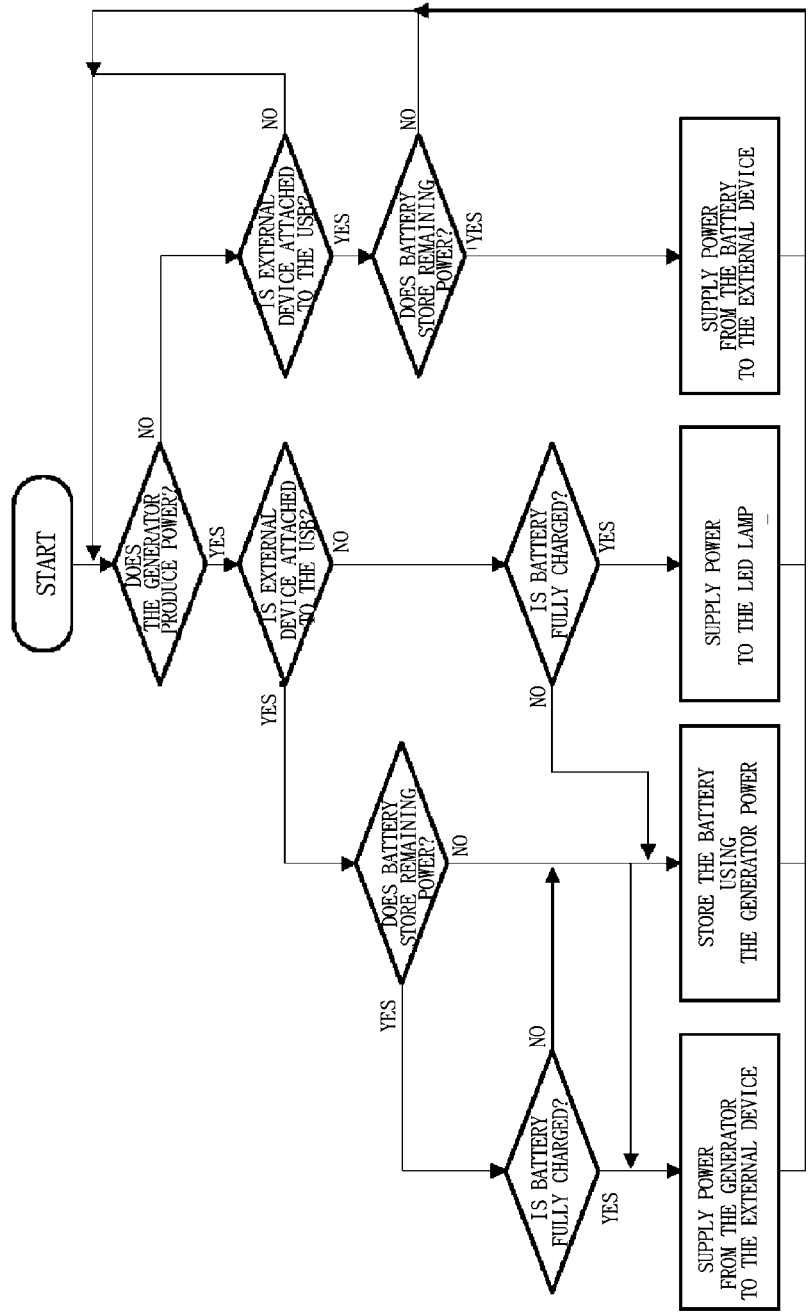
FIG. 9 is a flowchart showing a control method of a control device for the battery module according to the present invention in detail.
Figure 10:
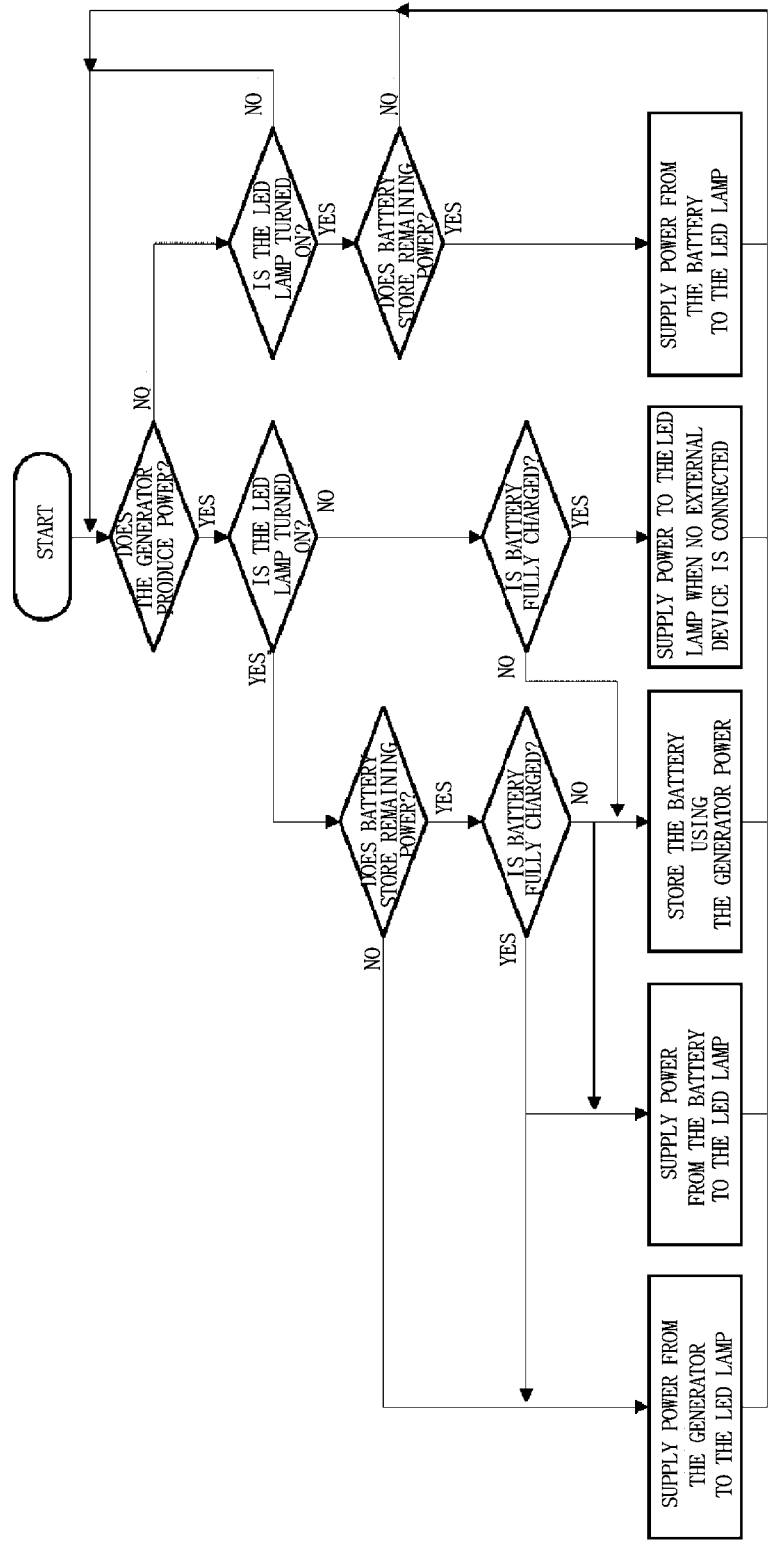
FIG. 10 is a flowchart schematically showing a control method of a control device for the battery module having an LED lamp.

FIG. 6 is a conceptual diagram of the battery module according to an embodiment of the present invention, FIG. 7 is a circuit diagram of the battery module according to an embodiment of the present invention, FIG. 8 is a flowchart schematically showing a control method of a control device for the battery module according to the present invention, FIG. 9 is a flowchart showing a control method of a control device for the battery module according to the present invention in detail, and FIG. 10 is a flowchart schematically showing a control method of a control device for the battery module having an LED lamp.

When referring to FIG. 6, the present invention provides a battery module which can be applied to all types of portable generators including a bicycle generator, and can accumulate power and charge all batteries irrespective of generated current which can be AC or DC current. The battery module is installed under the generator 20 as shown in the figure, and the battery module is installed in a removable manner. Therefore, the user can attach the battery module to and remove the battery module from different types of generators. Of course, it will be apparent to a person with an ordinary skill in the field that a battery module which is installed on the generator as an integral part is not excluded from the present invention.

The generator shown in FIG. 6 is not restricted to a contactless type generator for a bicycle which can be installed on a bicycle. Rather, the generator can also be applied to a photovoltaic generator, to a hydroelectric power generator for an outdoor use, and to a self-generating generator.

An input terminal 100, to which an output terminal of the generator 20 is connected, a rectifying unit 200, which converts the power produced in the generator to a desired constant voltage DC current, and a control circuit which charges the battery 320 using the power supplied from the rectifying unit and controls the power supplied to an LED lamp 360 or an external device connected through an universal serial bus (USB) terminal 340 are arranged on the printed circuit board (PCB).

When referring to FIG. 7 illustrating the electric circuit implemented on the PCB, the battery module according to the present invention is mainly divided into the input terminal 100 to which an output terminal of the generator 20 is connected, the constant voltage unit 200 which converts an output current from the generator inputted through the input terminal 100 into a constant DC current, and a charging unit 300 which is connected with the output terminal of the constant voltage unit 200 to charge the embedded battery 320 and supply power to various devices 340, 360.

The battery module according to the present invention can be applied to various kinds of generators. That is, it is possible to an AC or DC current outputted from output terminals of various types of generators can be converted to a constant current. When rectification circuits corresponding to different generation types are arranged altogether, it is possible to manufacture the battery module having the function as above. On the other hand, it makes the circuit complex and requires many rectifying elements. Therefore, the cost of the circuit rises, and the battery module becomes bulky. That is, this kind of configuration cannot meet the need such as the small size, lightweightness, appealing appearances, and the low cost required for accessory products for a bicycle.

Therefore, the present invention provides a rectifying unit 210 which minimizes the number of rectification circuits and the rectifying elements used while increasing the rectification efficiency. The rectifying unit 210 according to the present invention includes a two-phase rectifying circuit 212 with a center tap, and a three-phase bridge rectifying circuit 213. As an embodiment proposed by the present invention, the two-phase rectifying circuit 212 includes four input terminals 1, 2, 3, 4 and the three-phase rectifying circuit 213 includes three input terminals 5, 6, 7. Two input terminals 2, 3 of the four input terminals of the two-phase rectifying circuit are center tap input terminals.

The two-phase rectifying circuit 212 is connected with 4 output terminals of a two-phase AC generator for rectification, and the three-phase bridge rectifying circuit 213 is connected with three output terminals of a three-phase AC generator for rectification.

As for a single-phase AC generator, two output terminals can be connected with two input terminals 5/6, 5/7, 6/7 among the three input terminals 5, 6, 7 of the three-phase bridge rectifying circuit 213. By adopting this configuration, four diodes, which are electrically connected with the single-phase AC generator, among the six rectification diodes D1-D6 of the three-phase bridge rectifying circuit 213 are used for rectification, which makes the three-phase bridge rectifying circuit to function as a single-phase bridge rectifying circuit.

Meanwhile, as for a DC generator, the two-phase rectifying circuit 212 is directly connected with the DC generator without using a separate input terminal. A first output terminal of the DC generator is connected with one of the input terminals 1, 4, while a second output terminal is connected with one of the center tap input terminals 2, 3 (for example, 1/2, 1/3, 4/2, 4/3). As a result, when the DC generator is connected with the two-phase rectifying circuit, the number of diodes through which the DC current passes, is minimized, which results in an almost zero power loss.

According to the configuration of the input terminal 100 and the rectifying unit 210 as explained in the above, it is possible to rectify the output from various types of generators by using a minimum number of rectification circuits.

Although the proposed embodiment according the present invention adopts an AC voltage around 0-28 as the output voltage of the AC generator and a DC voltage around 0-40 V as the output voltage of the DC generator, it is apparent to a person with an ordinary skill in the field that the present invention is not restricted to this embodiment. This allowable voltage can be varied according to the power capacity of the generator and the power generation environment.

A switching regulator 220 is connected with the output terminal of the rectifying unit 210 which is explained in the above. The regulator 220 includes a smoothing element, and an input in the range of 7-40 V is switched in the constant voltage unit and outputted as a 5 V rated voltage.

The rectifying unit 210 and the regulator 220 constitute the constant voltage unit 200 according to the present invention.

The output terminal of the constant voltage unit 200 is connected with a charging unit 300 having a control circuit. The charging unit includes a battery 320, a USB terminal 340 to which the external device can be electrically connected, an LED lamp 360 which illuminates a front portion of the bicycle, and red and green indicator LEDs which display a state of charge of the battery. The power supply control among these components is performed by the control circuit in the charging unit.

Charging and discharging control methods using the aforementioned control circuit are explained by referring to FIGS. 8-10 in the following.

First, when referring to FIG. 8, when no power is generated in the generator, power is supplied to an external device when the external device is connected with the USB terminal.

When the generator produces power and no external device is connected with the USB terminal, the power from the generator is supplied to the battery to charge the battery.

When the generator produces power and the external device is connected with the USB terminal, the power from the generator is supplied both to the USB terminal and the external device. In the meantime, when the battery is fully charged, no more power is consumed by the battery. Therefore, all of the power from the generator will be supplied to the external device. Meanwhile, the power from the battery itself can be supplied to the USB terminal according to the state of charge of the battery.

It will be explained in more detail by referring to FIG. 9.

When referring to FIG. 9, when no external device is connected with the USB terminal 340, and when the generator produces power such that power is supplied from the output terminal of the constant voltage unit 200, the corresponding power is supplied to the battery such that the battery is charged (a red indicator LED will be turned on in this case). In the meantime, when the battery is fully charged, the power from the output terminal of the constant voltage unit 200 is supplied to the LED lamp 360 in order to prevent the battery from being overcharged and overheated, such that the LED lamp is turned on (a green indicator LED is turned on in this case).

Next, when the external device is connected with the terminal 340 but no power is produced from the generator, it is checked whether the battery 320 stores remaining power. When the battery 320 stores remaining power, the power is supplied from the battery to the terminal 340 to which the external device is connected.

Then, when the external device is connected with the USB terminal 340 and the generator produces power, a power supply method varies according to the remaining power of the battery 320.

First, let us assume that the battery 320 stores no remaining power (the first case). Then, the power supplied from the output terminal of the constant voltage unit is divided to be supplied to the battery and the external device. According to this control method, the charging speed of the battery 320 can be somewhat decreased. However, the user can utilize the external device without any inconvenience by supplying a predetermined level of power is supplied to the external device which is connected by the user. When the output voltage from the constant voltage unit is supplied only to the battery 320, the external device cannot be used until the battery 320 is charged up to a predetermined level; however, when the output voltage from the constant voltage unit is supplied only to the external device, excessive power cannot be utilized at all. Therefore, the method according to the present invention controls the output power from the constant voltage unit to be supplied both to the battery 320 and the terminal 340.

Second, let us assume that the battery 320 stores a certain degree of power but is not fully charged (the second case). In this case, as shown in FIG. 9, it is possible to control the output power from the constant voltage unit to be supplied both to the battery 320 and the terminal 340 in a manner similar to the case when the battery stores no remaining power.

In the meantime, it is also possible to supply the output power from the battery 320 to the external device. In this case, when the output power from the constant voltage unit is lower than the power required by the external device, the power from the battery can be used together to energize the external device. When the output power from the battery is supplied to the external device along with the power from the constant voltage unit, it is possible to stably energize the external device.

However, it should be noted that it is also possible to supply the output power from the constant voltage unit only to the battery 320 for charging, while supplying the power from the battery 320 to only to the external device. According to this method, the power is supplied from the battery, which outputs a relatively stable amount of current, to the external device, which enables a stable use of the external device.

Third, let us assume the battery 320 is fully charged (third case). In this case, the power supply to the battery 320 is disconnected. Therefore, the output power from the constant voltage unit is supplied to the external device.

In the meantime, it is also possible to supply the output power from the battery 320 to the external device. In this case, when the output power from the constant voltage unit is lower than the power required by the external device, the power from the battery can be used together to energize the external device. When the output power from the battery is supplied to the external device along with the power from the constant voltage unit, it is possible to stably energize the external device. It is needless to mention that, when the power amount stored in the battery decreases below a certain level, the power control will be performed in the manner similar to the second case as above When referring to FIG. 10, when the user turns off the switch of the LED lamp 360, and when the generator produces power such that power is supplied from the output terminal of the constant voltage unit 200, the corresponding power is supplied to the battery such that the battery is charged (a red indicator LED will be turned on in this case). In the meantime, when the battery is fully charged, the power from the output terminal of the constant voltage unit 200 is supplied to the LED lamp 360 in order to prevent the battery from being overcharged and overheated, such that the LED lamp is turned on even when the switch of the LED lamp is turned off (a green indicator LED is turned on in this case). Of course, this explanation is based on the case that no external device is connected to the terminal 340. When the external device is connected to the terminal 340, the power from the output terminal of the constant voltage unit 200 is supplied to the external device as explained by referring to FIG. 9 in the above.

Then, when the user turns on the switch of the LED lamp 360 but no power is produced from the generator, it is checked whether the battery 320 stores remaining power. When the battery 320 stores remaining power, the power is supplied from the battery to the LED lamp 360.

Next, when the user turns on the switch of the LED lamp 360 and the generator produces power, the power supply method varies according to the remaining power of the battery 320.

First, let us assume that the battery 320 stores no remaining power. In this case, the power supplied from the output terminal of the constant voltage unit is preferentially supplied to the LED lamp 360. When the user turns on the switch of the LED lamp 360, it can be estimated that the LED lamp 360 needs to be used. However, when only a portion of the power supplied from the output terminal of the battery is supplied to the battery 320, it can happen that the LED lamp 360 do not illuminate at a desired brightness. Therefore, it is also possible to supply the power from the output terminal of the battery to be supplied to the battery only when the power supplied from the output terminal of the battery is sufficient to turn on the LED lamp 360 up to a desired brightness.

Then, let us assume that the battery 320 stores a certain degree of power but is not fully charged. In this case, the output power from the constant voltage unit is supplied to charge the battery 320, while the power from the battery 320 is supplied to the external device. This method guarantees the brightness of the LED lamp 360 by enabling the power to be supplied from the battery, which outputs a relatively stable amount of current, to the LED lamp 360.

Then, let us assume the battery 320 is fully charged. In this case, the power supply to the battery 320 is disconnected in order to protect the battery 320. Therefore, the output power from the constant voltage unit is supplied to the external device. And the power charged in the battery can also be supplied to the LED lamp 360. This method is adopted to guarantee the brightness of the LED lamp 360, when the power from the constant voltage unit is not sufficient to energize the LED lamp 360, by supplementing the insufficient power using the power from the battery.

The LED lamp 360 shown in FIG. 10 can be installed on the battery module as an integral part. However, the LED lamp 360 can also be installed to be removed from the battery module. It is also possible that various other external devices other than the LED lamp 360 can also be attached to a connection terminal which is used for installing the external device. For example, the external device for which the power supply should be controlled or the external device which can be controlled by the method as shown in FIG. 10 can be installed to the connection terminal. That is, although in the aforementioned embodiments, the power supply control method as shown in FIG. 9 has been applied to a normal external device while the power supply control method as shown in FIG. 10 has applied to the LED lamp, it is also possible that the power supply control method as shown in FIG. 9 is applied to the LED lamp while the power supply control method as shown in FIG. 10 is applied to the normal external device. So, it is needless to mention that the battery module according to the present invention can include both a first USB terminal, which complies with the power supply control method in FIG. 9, a second USB terminal, which complies with the power supply control method in FIG. 10, and the LED lamp can be used as being installed to the second USB terminal.

For reference, the output voltage from the constant voltage unit can be decreased from 5V to 4.2V to charge the battery.

Also, by using the battery module according to the present invention, it is possible to supply sufficient power to the external device irrespective of remaining power of the battery such that the user can use the external device without any inconvenience, and it is also possible to enable the LED lamp to emit a sufficient amount of light, when required, by supplying power to the LED lamp using a proper manner irrespective of the remaining power of the battery.

Although the present invention has been explained by referring to the appended figures as in the above, it is to be noted than the present invention is not restricted to the embodiments and figures disclosed with this specification, and that various modifications can be made by the person having ordinary skill in the art within the scope of the technical spirit of the present invention. And, it is apparent that, although the effects according to the configuration of the present invention are not clearly written and described while explaining the embodiments of the present invention, any effect, which can be predicted by the corresponding configuration, can also be anticipated.

INDUSTRIAL APPLICABILITY

The present invention can be applied to a generator and a battery for a bicycle which can be applied to a rim of a bicycle wheel, and to a charging battery module which can be applied to various kinds of portable generators including the portable generator for a bicycle.

| NUMERICAL SYMBOLS | |
|---|---|
| 10: rim | 20: generator |
| 30: roating body | 31: center member housing unit |
| 33: magnet housing unit | 35: eddy current induction magnet |
| 37: center member | 39 rotation shaft housing unit |
| 60: generation unit | 62 rotation shaft |
| 64: magnet for generation | 66 core; |
| 68: coil | 70: case |
| 100: input terminal | 200 constant voltage unit |
| 210: rectifying unit | 212: two-phase bridge rectifying circuit |
| 213: three-phase bridge rectifying circuit | 220: regulator |
| 300: charging unit | 320: battery |
| 340: USB terminal | 360: LED lamp |

The invention claimed is:

1. A rotating body, comprising:

a rotation shaft provided through a center of the rotating body;

eddy current induction magnets arranged around the rotation shaft; and an outer circumferential surface surrounding the eddy current induction magnets and being made of a synthetic resin, wherein the outer circumferential surface of the rotating body made of the synthetic resin is (i) located between the eddy current induction magnets and a moving object and (ii) configured to be adjacent to but spaced apart from the moving object, wherein the eddy current induction magnets are installed such that N and S poles alternate which face the moving object upon rotation of the rotating body, thereby inducing eddy current on a surface of the moving object, wherein, when the outer circumferential surface of the rotating body comes into contact with the moving object, the outer circumferential surface of the rotating body undergoes a rolling friction with the moving object such that a kinetic energy of the moving object can be delivered to the rotating body, wherein, when the outer circumferential surface of the rotating body located between the eddy current induction magnets and the moving object collides with the moving object, the outer circumferential surface of the rotating body prevents the eddy current induction magnets from directly colliding with the moving object and absorbs impact energy while being elastically deformed by an impact, wherein, the outer circumferential surface of the rotating body allows magnetic flux generated by the eddy current induction magnets to pass through the outer circumferential surface and to reach the moving object so that eddy current is induced on the surface of the moving object by the magnetic flux, wherein the eddy current applies magnetic force back to the eddy current induction magnets and pulls the eddy current induction magnets in a direction that the moving object moves so that the rotating body rotates without a contact with the moving object.

2. The rotating body according to claim 1,
wherein the eddy current induction magnets are insertable into the rotating body from outside the rotating body or are embedded inside the rotating body,
wherein the outer circumferential surface of the rotating body covers outer sides of the eddy current induction magnets.

3. The rotating body according to claim 1, further comprising
a magnet housing unit being circumferentially arranged and housing the eddy current induction magnets,
wherein the magnet housing unit has an angled shape and prevents a rotational movement of the eddy current induction magnets within the rotating body.

4. The rotating body according to claim 1, further comprising:
a center member,
wherein rigidity of the center member is higher than the synthetic resin,
wherein the center member is installed at the center of the rotating body, and
wherein the rotation shaft is fixed in a center of the center member.

5. The rotating body according to claim 4,
wherein uneven structures are formed on an outer circumferential surface of the center member,
wherein a center member housing unit is formed between a center of the rotating body and the magnet housing unit,
wherein the center member housing unit is in a shape corresponding to the uneven structures of the center member,
wherein the center member and the center member housing unit are engaged with each other such that the center member rotates with the rotating body as an integral part.

* * * * *